(12) United States Patent
Ahn et al.

(10) Patent No.: US 10,701,315 B2
(45) Date of Patent: Jun. 30, 2020

(54) VIDEO COMMUNICATION DEVICE AND VIDEO COMMUNICATION METHOD

(71) Applicant: HYPERCONNECT, INC., Seoul (KR)

(72) Inventors: Sangil Ahn, Cheongju-si (KR);
Kangsik Jung, Seoul (KR); Hyountaek Yong, Seoul (KR)

(73) Assignee: HYPERCONNECT, INC., Seoul (KR)

( * ) Notice: Subject to any disclaimer, the term of this patent is extended or adjusted under 35 U.S.C. 154(b) by 0 days.

(21) Appl. No.: 16/617,031

(22) PCT Filed: Jan. 18, 2018

(86) PCT No.: PCT/KR2018/000830
§ 371 (c)(1),
(2) Date: Nov. 26, 2019

(87) PCT Pub. No.: WO2018/221824
PCT Pub. Date: Dec. 6, 2018

(65) Prior Publication Data
US 2020/0154078 A1    May 14, 2020

(30) Foreign Application Priority Data
May 27, 2017  (KR) .................. 10-2017-0065732

(51) Int. Cl.
*H04N 7/14* (2006.01)
*H04N 21/44* (2011.01)
(Continued)

(52) U.S. Cl.
CPC .......... *H04N 7/147* (2013.01); *G06K 9/00302* (2013.01); *G06K 9/00335* (2013.01);
(Continued)

(58) Field of Classification Search
CPC ........ H04N 7/14; H04N 21/44; H04N 21/488; H04N 21/454; H04N 5/445; G06K 9/00; G06N 20/00; G06N 5/04
(Continued)

(56) References Cited

U.S. PATENT DOCUMENTS 7,283,969 B1 * 10/2007 Marsico ............. G06Q 30/0281
379/210.02
9,503,456 B1    11/2016 Lindberg et al.
(Continued)

FOREIGN PATENT DOCUMENTS

WO    2015/091487 A1    6/2015

OTHER PUBLICATIONS

International Search Report of PCT/KR2018/000830 dated Apr. 24, 2018.

*Primary Examiner* — Mellur Ramakrishnaiah
(74) *Attorney, Agent, or Firm* — Sughrue Mion, PLLC

(57) ABSTRACT

One embodiment relates to a video communication device and video communication method, capable of preventing a user who is making a video communication from being exposed to an inappropriate image from the other party and may provide a video communication method comprising establishing a video communication session with a first terminal, receiving an image stream from the first terminal through the video communication session, examining at least one first image selected from images included in the image stream, displaying a message suggesting reporting a user of the first terminal as an abusive user when a second image included in the at least one first image includes an abusive element, receiving input of confirmation in response to the displaying the message, and transmitting the reporting
(Continued)

a user of the first terminal as an abusive user and the second image to a server in response to the received input of confirmation.

17 Claims, 12 Drawing Sheets

(51) Int. Cl.
- *H04N 21/488* (2011.01)
- *H04N 21/454* (2011.01)
- *G06N 5/04* (2006.01)
- *G06K 9/00* (2006.01)
- *H04N 5/445* (2011.01)
- *G06N 20/00* (2019.01)

(52) U.S. Cl.
CPC ........... *G06K 9/00718* (2013.01); *G06N 5/04* (2013.01); *G06N 20/00* (2019.01); *H04N 5/445* (2013.01); *H04N 21/44008* (2013.01); *H04N 21/454* (2013.01); *H04N 21/4882* (2013.01)

(58) Field of Classification Search
USPC .......................................... 348/14.01–14.16
See application file for complete search history.

(56) References Cited

U.S. PATENT DOCUMENTS

| | | |
|---|---|---|
| 2014/0043426 A1 | 2/2014 | Bicanic et al. |
| 2015/0030314 A1 | 1/2015 | Skarakis |
| 2015/0070516 A1* | 3/2015 | Shoemake ....... H04N 21/42203 348/207.11 |
| 2016/0034786 A1 | 2/2016 | Suri et al. |
| 2017/0223310 A1* | 8/2017 | Farrell ................. A63F 13/352 |

\* cited by examiner

VIDEO COMMUNICATION DEVICE AND VIDEO COMMUNICATION METHOD

CROSS REFERENCE TO RELATED APPLICATIONS

This application is a National Stage of International Application No. PCT/KR2018/000830 filed Jan. 18, 2018, claiming priority based on Korean Patent Application No. 10-2017-0065732 filed May 27, 2017.

TECHNICAL FIELD

One or more embodiments relate to a video communication device and video communication method, which are capable of preventing a user who is making a video communication from being exposed to an inappropriate image from the other party.

BACKGROUND ART

With the development of communication technology and the miniaturization of electronic devices, personal terminals have become widespread to general consumers. In particular, portable personal terminals such as smart phones or smart tablets have been widely used in recent years. Most of terminals include a communication function. A user may use a terminal to perform a search on the Internet or exchange messages with the other party.

In addition, with the development of small camera, small microphone, small display, and small speaker technology, most terminals such as smart phones include cameras, microphones, displays, and speakers. A user can record a voice or capture a video containing voice using a terminal. The user can confirm the recorded voice through a speaker included in the terminal or confirm the captured video through a display.

In addition, a user can share the recorded voice or the captured video with the other party using a communication function of a terminal. The user can transmit the previously recorded voice or the previously captured video to the other party. The user can also transmit a voice currently being recorded by the terminal or a video currently being captured to the other party in real time.

At the same time, the other party can transmit a voice currently being recorded or a movie currently being captured by a terminal to the user in real time. The display included in the user's terminal can simultaneously display a video currently being captured by the user's terminal and a video currently being captured by the other party's terminal. In addition, a speaker included in the terminal of the user can simultaneously reproduce the voice currently being recorded by the terminal of the other party. In other words, the user and the other party can make a video communication with each other using their own terminals.

The user and the other party may already be acquainted with each other or may not be acquainted with each other. A plurality of terminals including the terminal of the user and the terminal of the other party may be connected to the server. The server can mediate between the terminal of the user and the terminal of the other party. Therefore, even if the user and the other party do not know each other, they can make a video communication with each other through mediation of the server.

While a user is in a video communication with the other party, the user may be exposed to an inappropriate image from the other party. Particularly, while the user is in a video communication with the other party having an unknown relationship with each other, there is a high possibility that the user is exposed to obscene images from the other party.

For example, a naked body image of the other party captured by the other party's terminal may be received at the user's terminal through the video communication session. The user's terminal displays the received image so that the user can be exposed to the sexually obscene image. When the user is exposed to an obscene image that she or he does not want, the user may feel sexual shame or unpleasant.

DISCLOSURE

Technical Problem

One or more embodiments may provide a video communication device and a video communication method, which are capable of inducing a healthy video communication between users.

One or more embodiments may provide a video communication device and a video communication method, which are capable of preventing a user who is making a video communication from being exposed to an inappropriate image from the other party.

One or more embodiments may provide a video communication device and a video communication method, which are capable of preventing a user who is making a video communication from feeling sexual shame or unpleasant caused by an image from the other party.

Technical Solution

According to an embodiment, a video communication method may comprise establishing a video communication session with a first terminal, receiving an image stream from the first terminal through the video communication session, examining at least one first image selected from images included in the image stream, displaying a message suggesting reporting a user of the first terminal as an abusive user when it is determined that a second image included in the at least one first image includes an abusive element, receiving input of confirmation in response to the displaying the message, and transmitting the reporting a user of the first terminal as an abusive user and the second image to a server in response to the received input of confirmation.

Further, the examining may comprise attempting to detect the abusive element from each of the at least one first image.

Further, the attempting to detect the abusive element may comprise attempting to detect a portion corresponding to a specific facial expression, body language, or body part from each of the at least one first image.

Further, the attempting to detect a portion corresponding to a specific facial expression, body language, or body part may comprise attempting to detect a portion corresponding to at least one of an obscene gesture, an insult gesture, a racism gesture, sexual content, nudity, genitalia, sexual activity, unsanitary content, excreta, excretion, antisocial content, antihuman content, illegal conduct, criminal conduct, hate crime, violent conduct, maltreatment conduct, self-harmful conduct, a weapon, a drug, an antisocial symbol, hateful content, threatening content, phobia-inducing content, or blood from each of the at least one first image.

Further, the examining may comprise attempting to detect the abusive element from at least one third image selected from images included in the image stream and received in a period of recent specific time.

Further, the examining may comprise repeating the attempting to detect the abusive element with regular or irregular cycles until the abusive element is detected when the abusive element is not detected from the at least one third image.

Further, the video communication method may comprise, after the transmitting, repeating the examining through the transmitting with regular or irregular cycles until the video communication session is completed.

Further, the video communication method may comprise, before the establishing the video communication session, preparing a machine learning model trained using information on at least one fourth image and on whether each of the at least one fourth image includes the abusive element, wherein the examining may include predicting whether the at least one first image includes the abusive element using the trained machine learning model.

Further, the predicting may comprise calculating a probability, for each of the at least one first image, in which the at least one first image includes the abusive element using the trained machine learning model, detecting at least one fifth image, in which the calculated probability is a specific threshold value or more, among the at least one first image, and determining that each of the at least one fifth image includes the abusive image.

Further, the predicting may comprise calculating a probability, for each of at least one sixth image selected from images included in the image stream and received in a period of recent specific time, in which the at least one sixth image includes the abusive element, using the trained machine learning model, detecting at least one seventh image, in which the calculated probability is a specific threshold value or more, among the at least one sixth image, determining that each of the at least one seventh image includes the abusive image, and storing an image as the second image, in which the calculated probability is highest, among the at least one seventh image.

Further, the predicting may comprise calculating, after at least a period of specific waiting time passes, a probability, for each of at least one eighth image selected from images included in the image stream and received in a period of recent specific time, in which the at least one eighth image includes the abusive element using the trained machine learning model, updating the stored second image as an image corresponding to a highest probability when the highest probability among the probabilities calculated for the at least one eighth image is higher than the probability calculated for the stored second image, and repeating the calculating the probability and the updating for each of the at least one eighth image until the video communication session is completed.

Further, the displaying the message may comprise displaying the message after the video communication session is completed or while the video communication session is being retained.

Further, the displaying the message may comprise displaying the message with the second image.

According to another embodiment, a video communication method may comprise establishing a video communication session between a first terminal and second terminal, transmitting, by the first terminal, an image stream to the second terminal through the video communication session, examining, by the first terminal, at least one first image selected from images included in the image stream, displaying, by the second terminal, a message suggesting submitting reporting a user of the first terminal as an abusive user when the examination determines that a second image included in the at least one first image includes an abusive element, receiving, by the second terminal, input of confirmation in response to the displaying the message, and transmitting, by the second terminal, the reporting a user of the first terminal as an abusive user and the second image to a server in response to the received input of confirmation.

Further, the other video communication method may comprise, after the examining, transmitting, by the first terminal, the second image to the second terminal and receiving and storing, by the second terminal, the second image.

According to still another embodiment, a video communication device may comprise a communication interface configured to establish a video communication session with a first terminal and to receive an image stream from the first terminal through the video communication session, a controller configured to examine at least one image selected from images included in the image stream, an output interface configured to display a message suggesting submitting reporting a user of the first terminal as an abusive user when the examination determines that a second image included in the at least one first image includes an abusive element, and an input interface configured to receive input of confirmation in response to the displaying the message, wherein the communication interface may transmit the reporting a user of the first terminal as an abusive user and the second image to a server in response to the received input of confirmation.

Advantageous Effects

One or more embodiments can induce a healthy video communication between users.

One or more embodiments can prevent a user who is making a video communication from being exposed to an inappropriate image from the other party.

One or more embodiments can prevent a user who is making a video communication from feeling sexual shame or unpleasant caused by an image from the other party.

MODE FOR INVENTION

Advantages and features of the present disclosure and a method of achieving the same will be more clearly understood from embodiments described below in detail with reference to the accompanying drawings. However, the present disclosure is not limited to the following embodiments and may be implemented in various different forms. The embodiments are provided merely to complete the present disclosure and to provide those of ordinary skill in the art with the category of the present disclosure. The present disclosure is defined only by the claims. Wherever possible, the same reference numbers will be used throughout the specification to refer to the same or like components.

It will be understood that although the terms "first," "second," etc. may be used to describe various components, these components should not be limited by these terms. These terms may be only used to distinguish one component from another. Therefore, a first component used herein may be a second component within the technical scope of the present disclosure.

The terminology used herein is for the purpose of describing embodiments and is not intended to limit the present disclosure. As used herein, the singular forms are intended to include the plural forms as well, unless the context clearly indicates otherwise. It will be further understood that the terms "comprises" or "comprising" used in this specification may denote that the used components or steps do not preclude the presence or addition of one or more other components and/or steps.

Unless otherwise defined, all terms used herein have the same meaning as commonly understood by those of ordinary skill in the art. It will be further understood that terms, such as those defined in commonly used dictionaries, will not be interpreted in an idealized or overly formal sense unless expressly so defined herein.

Hereinafter, video communication devices 200, 210, and 220, a video communication method, video communication medicating method, according to embodiments, will be described in detail with reference to FIGS. 1 to 10.

Figure 1:
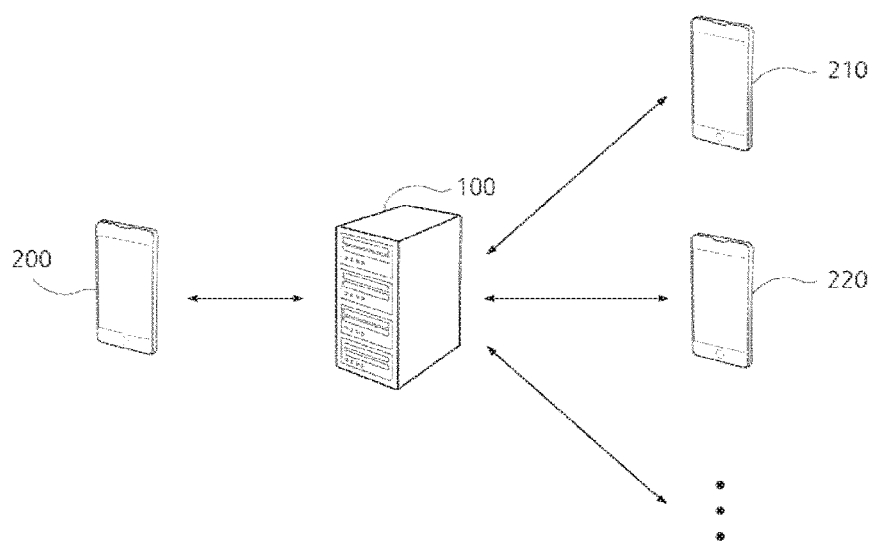
FIG. 1 is a network configuration diagram illustrating an environment in which a video communication device according to an embodiment operates.

FIG. 1 is a network configuration diagram illustrating an environment in which the video communication devices 200, 210, and 220 according to an embodiment operate. Referring to FIG. 1, the environment in which the video communication devices 200, 210, and 220 operate may include a server 100 and at least two of the video communication devices 200, 210, and 220 connected to each other. Although the video communication devices 200, 210, and 220 are only illustrated in FIG. 1 as a matter of convenience, an additional video communication device other than the video communication devices 200, 210, and 220 may be included.

The server 100 may be connected to a communication network. The server 100 may be connected to an external device via the communication network. The server 100 may transmit data to other devices connected to each other or receive data from other devices.

The communication network connected to the server 100 may include a wired communication network, a wireless communication network, or a composite communication network. The communication network may include a mobile communication network such as 3G, Long Term Evolution (LTE), or LTE-A. The communication network may include a wired or wireless communication network such as Wi-Fi, Universal Mobile Telephone System/General Packet Radio Service (UMTS/GPRS), or Ethernet. The communication network may include a short-range communication network such as Magnetic Secure Transmission (MST), Radio Frequency Identification (RFID), Near Field Communication (NFC), ZigBee, Z-Wave, Bluetooth, Bluetooth Low Energy (BLE), or InfraRed (IR) communication. The communication network may include Local Area Network (LAN), Metropolitan Area Network (MAN), or Wide Area Network (WAN).

The server 100 may be connected to each of the video communication devices 200, 210, and 220 through a communication network. When the server 100 is connected to a first video communication device 200, the server 100 may transceive data with the first video communication device 200 through a communication network. When the server 100 is connected to a second video communication device 210, the server 100 may transceive data with the second video communication device 210 through a communication network. When the server 100 is connected to a third video communication device 220, the server 100 may transceive data with the third video communication device 220 through a communication network.

The server 100 may receive data from the video communication devices 200, 210, and 220. The server 100 may operate calculations using data received from the video all devices 200, 210, and 220. The server 100 may transmit the calculation result to the video communication devices 200, 210, and 220.

The server 100 may receive mediation requests of video communications from a plurality of video communication devices 200, 210, and 220. The server 100 may select at least two video communication devices among the plurality of video communication devices 200, 210, and 220 that transmit the mediation requests. For example, the server 100 may select the first video communication device 200 and the second video communication device 210 as the at least two video communication devices 200, 210, and 220.

The server 100 may mediate a connection of a video communication between the selected at least two video communication devices 200, 210, and 220. For example, the server 100 may transmit the connection information on the first video communication device 200 to the second video communication device 210. As another example, the server 100 may transmit the connection information on the second video communication device 210 to the first video communication device 200.

The connection information on the first video communication device 200 may include, for example, an IP address and a port number of the first video communication device 200. The second video communication device 210 receiving the connection information on the first video communication device 200 may attempt to connect to the first video communication device 200 using the received connection information.

The connection information on the second video communication device 210 may include, for example, an IP address and a port number of the second video communication device 210. The first video communication device 200 receiving the connection information on the second video communication device 210 may attempt to connect to the second video communication device 210 using the received connection information.

Succeeding in an attempt to connect the first video communication device 200 to the second video communication device 210 or an attempt to connect the second video communication device 210 to the first video communication device 200 may enable the establishment of a video communication session between the first video communication device 200 and the second video communication device 210. The first video communication device 200 may transmit an image or sound to the second video communication device 210 through the video communication session. The first video communication device 200 may encode an image or sound into a digital signal and transmit the encoded result to the second video communication device 210.

Further, the first video communication device 200 may receive an image or sound from the second video communication device 210 through the video communication session. The first video communication device 200 may receive an image or sound encoded in a digital signal and may decode the received encoded image or sound.

The second video communication device 210 may transmit an image or sound to the first video communication device 200 through the video communication session. Further, the second video communication device 210 may receive an image or sound from the first video communication device 200 through the video communication session. Accordingly, a user of the first video communication device 200 and another user of the second video communication device 210 may make a video communication with each other.

The video communication devices 200, 210 and 220 may be terminals. The video communication devices 200, 210 and 220 may be, for example, desktop computers, laptop computers, smart phones, smart tablets, smart watches, mobile terminals, digital cameras, wearable devices, or portable electronic devices. The video communication devices 200, 210, and 220 may execute programs or applications. Each of the video communication devices 200, 210 and 220 may be the same kind of device each other or may not be the same kind of device each other.

Hereinafter, the first video communication device 200 and a first terminal 200 may be interchangeably used as a term to refer to the first video communication device 200 for the convenience of description. Hereinafter, the second video communication device 210 and a second terminal 210 will be interchangeably used as a term to refer to the second video communication device 210 and a third video communication device 220, and the third terminal 220 will be interchangeably used as a term to refer to the third video communication device 220.

Figure 2:
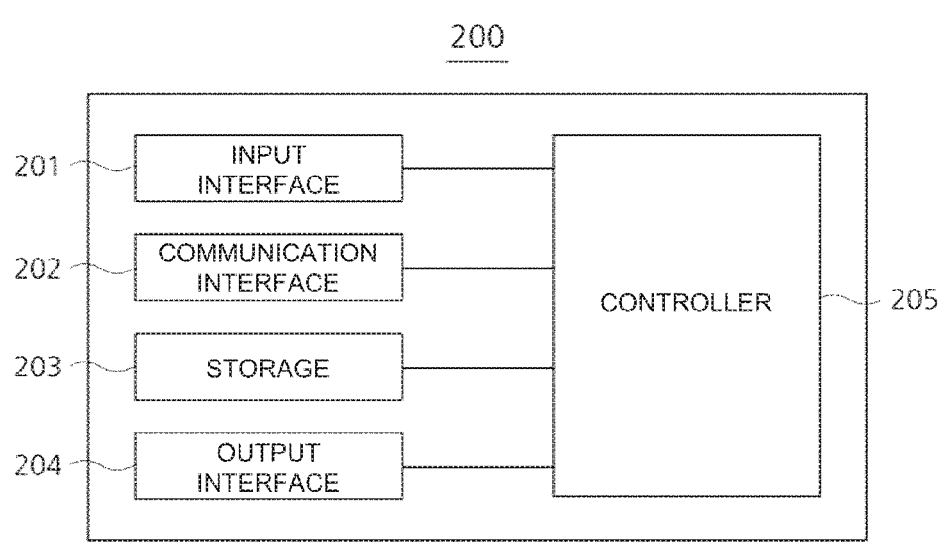
FIG. 2 is a block diagram illustrating a configuration of a video communication device according to an embodiment.

FIG. 2 is a block diagram showing a configuration of the first terminal 200 according to an embodiment. The configuration of the second terminal 210 or the configuration of the third terminal 300 may be the same as or different from the configuration of the first terminal 200. Referring to FIG. 2, the first terminal 200 according to the embodiment may include an input interface 201, a communication interface 202, a storage 203, an output interface 204, and a controller 205.

The input interface 201 may receive input from the outside. The input interface 201 may receive input from a user of the first terminal 200. Further, the input interface 201 may receive a signal from an external device as the input. The input interface 201 may include, for example, a microphone, a camera, a keyboard, a mouse, a trackball, a touch screen, a button, a switch, a sensor, a network interface, or other input devices.

The input interface 201 may receive light from outside through a camera included in the input interface 201. The input interface 201 may receive light emitted from an external object or light reflected from an external object. The input interface 201 may consecutively capture images of the surrounding area of the first terminal 200 through the camera. The input interface 201 may capture an image of a user of the first terminal 200.

The input interface 201 may receive a sound from outside through a microphone included in the input interface 201. The input interface 201 may receive a sound from the user of the first terminal 200. Further, the input interface 201 may receive a sound from an external sound reproducing device. The input interface 201 may consecutively record sounds from the surrounding area of the first terminal 200 through the microphone. The input interface 201 may record a voice of the user of the first terminal 200.

The communication interface 202 may transmit data to the exterior or receive data from the exterior. The communication interface 202 may transmit data to the other video communication devices 200, 210, and 220 or the server 100. The communication interface 202 may receive data from the other video communication devices 200, 210, and 220 or the server 100. The communication interface 202 may transmit the result of the arithmetic operation performed by the controller 205 to the exterior. Further, communication interface 202 may transmit data stored in the storage 203 to the exterior. The communication interface 202 may transmit the image captured or the sound recorded by the input interface 201 to the exterior.

Data to be transmitted by the communication interface 202 or data received by the communication interface 202 may be stored in the storage 203. For example, the communication interface 202 may transmit an encoded image or voice stored in the storage 203 to the server 100 or the other video communication devices 200, 210, and 220. Further, the communication interface 202 may receive an image or a voice encoded by the other video communication devices 200, 210, and 220 from the other video communication devices 200, 210, and 220.

The communication interface 202 may include, for example, a long-range network interface such as a 3G module, an LTE module, an LTE-A module, a Wi-Fi module, a WiGig module, an Ultra Wide Band (UWB) module, or a LAN card. Further, the communication interface 203 may include, for example, a short-range network interface such as an MST module, a Bluetooth module, an NFC module, an RFID module, a ZigBee module, a Z-Wave module, or an IR module. Further, the communication interface 203 may include other network interfaces.

The storage 203 may store data. The storage 203 may store the input received by the input interface 201. The storage 203 may store the image captured or the sound recorded by the input interface 201. The storage 203 may store data to be used by the controller 205 to perform an arithmetic operation. The storage 203 may store the result of the arithmetic operation performed by the controller 205. For example, the storage 203 may store the image or voice encoded by the controller 205. The storage 203 may store data to be transmitted to the outside through the communication interface 202 or may store data received from the outside through the communication interface 202.

The storage 203 may include a volatile memory or a non-volatile memory. The storage 203 may include, for example, flash memory, read-only memory (ROM), random access memory (RAM), electrically erasable read-only memory (EEROM), erasable programmable read-only memory (EPROM), electrically erasable and programmable read-only memory (EEPROM), hard disk drive (HDD), register, or the like. The storage 203 may include, for example, a file system, a database, or an embedded database.

The output interface 204 may output a signal to the exterior. The output interface 204 may, for example, display a screen, reproduce a sound, or output a vibration. The output interface 204 may include a display, a speaker, a vibrator, an oscillator, or other output devices.

The output interface 204 may display a screen. The controller 205 may control the output interface 204 to display a screen. The output interface 204 may display a user interface. The output interface 204 may display another screen in response to an input of a user.

The output interface 204 may display data. The output interface 204 may display the result of the arithmetic operation performed by the controller 205. The output interface 204 may display data stored in the storage 202. The output interface 204 may display data received by the communication interface 204.

The output interface 204 may display an image of a user of the first terminal 200 captured by the input interface 201 or images of the other users captured by the other video communication devices 200, 210, and 220. Further, the output interface 204 may reproduce the voice of the user of the first terminal 200 recorded by the input interface 201 or the voice of the other users recorded by the other video communication devices 200, 210, and 220.

The output interface 204 may include, for example, a flat-panel display device such as a liquid crystal display (LCD), an organic light-emitting diode (OLED), or a plasma display panel (PDP). The output interface 204 may include a curved display or a flexible display. The output interface 204 may include a touchscreen.

The controller 205 may control an operation of the first terminal 200. The controller 205 may be connected to the components included in the first terminal 200. The controller 205 may control each operation of the components included in the first terminal 200

The controller 205 may process a signal. The controller 205 may process a signal received by the input interface 201. For example, the controller 205 may process the images of the users, captured by the camera included in the input interface 201. The controller 205 may process a sound and a voice of a user, recorded by the microphone included in the input interface 201.

The controller 205 may process the signal received by the communication interface 203. For example, the controller 205 may process a request of the user, received through the communication interface 202. The controller 205 may process images or voices of other users received through the communication interface 202.

The controller 205 may control an operation of the first terminal 200 in response to a signal received by the input interface 201. The controller 205 may control operation of the first terminal 200 in response to a request of a user received by the input interface 201.

The controller 205 may perform an arithmetic operation. The controller 205 may perform an arithmetic operation according to a signal received by the input interface 201. The controller 205 may perform an arithmetic operation using a signal received by the input interface 201 or data stored in the storage 203. For example, the controller 205 may perform image-processing using an image captured by the camera included in the input interface 201. The controller 205 may encode an image captured by the camera included in the input interface 201. The controller 205 may encode a sound or a voice recorded by the microphone included in the input interface 201. The controller 205 may encode a sound or a voice recorded by the camera included in the input interface 201.

The controller 205 may decode images or voices of other users, received by the communication interface 202. The controller 205 may perform post-processing on the decoded image or voice. For example, the controller 205 may perform image-processing on images of other users, received by the communication interface 202.

The controller 205 may control such that the result of the arithmetic operation is stored in the storage 203. The controller 205 may control such that the result of the arithmetic operation is output by the output interface 105. The controller 204 may control that the result of the arithmetic operation is transmitted to the other video communication devices 200, 210, and 220 by the communication interface 202.

The controller 205 may include, for example, a central processing unit (CPU), a graphic processing unit (GPU), a micro controller unit (MCU), or a microprocessor.

A type of the second terminal 210 may be same as or different from a type of the first terminal 200. The second terminal 210 may execute a program or an application.

The second terminal 210 may be connected to a communication network. The second terminal 210 may be connected to an external device with each other via the communication network. The second terminal 210 may transmit data to the connected external device or receive data from the connected external device.

The second terminal 210 may be connected to the first terminal 200 with each other by the mediation of the server 100. The second terminal 210 may transmit data to the first terminal 200 or receive data from the first terminal 200. The first terminal 200 and the second terminal 210, which are connected to each other, may transceive a message, a file, data, an image, a video, a sound, or a voice, and so on with each other.

The second terminal 210 may establish a voice communication session or a video communication session with the first terminal 200. The video communication session may be established using, for example, transmission control protocol (TCP), user datagram protocol (UDP), or web real-time communication (WebRTC). The user of the first terminal 200 and the user of the second terminal 210 may make a voice communication or a video communication with each other.

The video communication session may directly be established between the first terminal 200 and the second terminal 210. According to another example, the video communication session may directly be established between the first terminal 200 and the second terminal 210 via at least one other device. For example, the video communication session may include a session established between the first terminal 200 and the server 100 and a session established between the server 100 and the second terminal 210.

The first terminal 200 and the second terminal 210 may directly exchange data with each other. Further, the first terminal 200 and the second terminal 210 may exchange data with each other via the server 100 or other mediating devices.

A type of the third terminal 220 may be identical to or different from a type of the first terminal 200. The third terminal 220 may execute a program or an application.

The third terminal 220 may be connected to a communication network. The third terminal 220 may be connected to an external device with each other via the communication network. The third terminal 220 may transmit data to the connected external device or receive data from the connected external device.

Hereinafter, the specific operations of the video communication devices 200, 210, and 220 in the video communication method, according to an embodiment, will be described in detail with reference to FIGS. 3 to 12.

Figure 3:
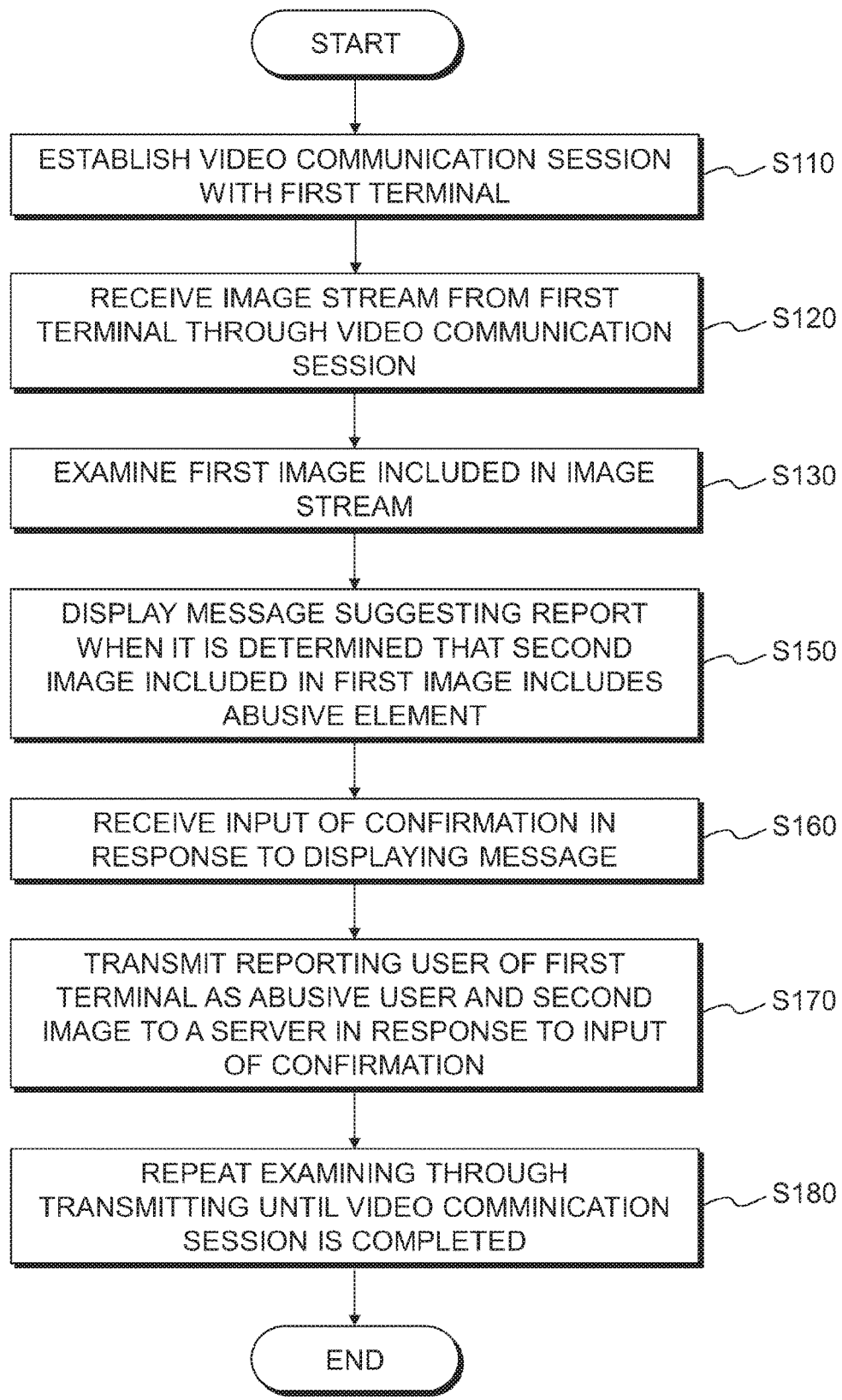
FIG. 3 is a flowchart illustrating a process of performing a video communication method according to an embodiment.

FIG. 3 is a flowchart illustrating a process of performing a video communication method by the second terminal 210, according to an embodiment. Referring to FIG. 3, in the video communication method according to an embodiment, first, the operation S100 may be performed to establish a video communication session with the first terminal 200.

The server 100 may transmit connection information on the first terminal 200 to the second terminal 210. The communication interface 202 of the second terminal 210 may receive the connection information from the server 100. The communication interface 202 of the second terminal 210 may attempt to connect to the first terminal 200 using the connection information. Succeeding in an attempt on the connection, the second terminal 210 may establish a video communication with the first terminal 200.

According to another embodiment, the server 100 may transmit connection information on the second terminal 210 to the first terminal 200. The communication interface 202 of the first terminal 200 may attempt to connect to the second terminal 210 using the connection information. The communication interface 202 of the second terminal 210 may accept the attempt of the connection. Accordingly, the second terminal 210 may establish a video communication with the first terminal 200.

Next, the operation S120 may be performed to receive the image stream from the first terminal 200 through the video communication session. The communication interface 202 of the second terminal 210 may receive the image stream from the first terminal through the video communication session. The image stream may include an image captured or a sound recorded by the first terminal 200 in real time. In other words, the communication interface 202 of the second terminal 210 may consecutively receive an image of a user of the first terminal 200 being captured or a sound of a user of the first terminal 200 being recorded by the first terminal 200 from the first terminal 200. The communication interface 202 of the second terminal 210 may continuously receive the image stream while the video communication session is being retained.

The image stream may be received using an interface and protocol of Web Real-Time Communication (WebRTC). The image stream may include an encoded image or sound. The controller 205 of the second terminal 210 may decode the encoded image or sound. The output interface 204 of the second terminal 210 may output the decoded image or sound.

The image stream may include at least one image. Each of the at least one image may have a corresponding sequence number. The sequence number may be, for example, a timestamp. The output interface 204 of the second terminal 210 may sequentially output the at least one image according to an order of the corresponding sequence number. According to another embodiment, the output interface 204 of the second terminal 210 may sequentially output the at least one image according to an order in which the corresponding sequence number is received.

The output interface 204 of the second terminal 210 may consecutively output the at least one image included in the image stream while the video communication session is being retained. The output interface 204 of the second terminal 210 may consecutively output images newly being received through the image stream while the video communication session is being retained.

The communication interface 202 of the second terminal 210 may transmit the image stream to the first terminal through the video communication session. The image stream may include an image captured or a sound recorded by the input interface 201 the second terminal 210 in real time. In other words, the communication interface 202 of the second terminal 210 may consecutively transmit an image of a user of the second terminal 210 being captured or a sound of a user of the second terminal 210 being recorded by the second terminal 210 to the first terminal 200. The communication interface 202 of the second terminal 210 may continuously transmit the image stream while the video communication session is being retained.

The controller 205 of the second terminal 210 may encode the image captured or the sound recorded by the input interface 201. The image stream may include the encoded image or sound. The image stream may be transmitted using an interface and protocol of WebRTC.

The output interface 204 of the second terminal 210 may transmit the image captured or the sound recorded by the input interface 201. The output interface 204 of the second terminal 210 may consecutively transmit the image or sound while the video communication session is being retained. The output interface 204 of the second terminal 210 may consecutively output images being newly transmitted through the image stream while the video communication session is being retained.

Figure 4:
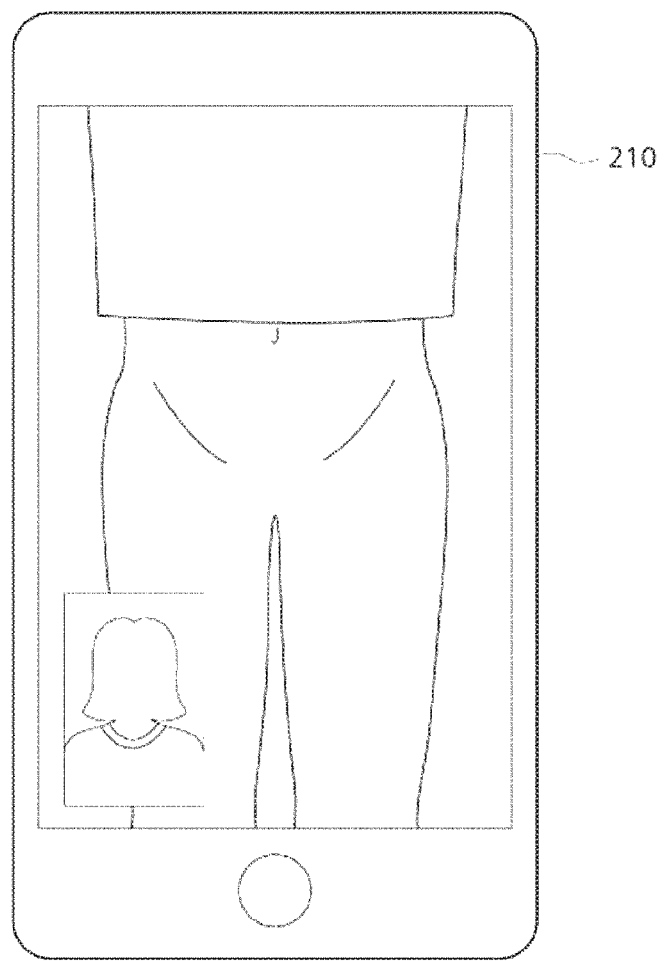
FIG. 4 is a front view illustrating a second video communication device in which an image of a user of the second video communication device and an image of the other party are displayed during a video communication according to an embodiment.

The output interface 204 of the second terminal 210 may simultaneously output the image included in the image stream received from the first terminal 200 and the image captured by the input interface 201 of the second terminal 210 on one screen. FIG. 4 is a front view illustrating a second terminal in which an image of a user of the second terminal 210 and an image of a user of the first terminal 200 are displayed during a video communication according to an embodiment. As shown in FIG. 4, the output interface 204 of the second terminal 210 may display the image captured by the input interface 201 on a rectangular area positioned at the lower left of the display. Further, the output interface 204 of the second terminal 210 may display the image received by the communication interface 202 on the remaining area of the entire area of the display except for the rectangular area.

Referring again to FIG. 3, the operation S130 may next be performed to examine the at least one first image selected from images included in the image stream. The controller 205 of the second terminal 210 may select at least one image from images included in the image stream. The controller 205 may select the specific number of images from images included in the image stream as the first image at random or regular intervals. The specific number may be, for example, five.

According to another embodiment, the controller 205 may select the specific number of images recently received from images included in the image stream as the first image. The specific number may be, for example, five.

According to still another embodiment, the controller 205 may select, at random or regular intervals, the specific number of images, as the first image, from images received in a period of recent specific time, which is included in the image stream. The specific time may be, for example, three seconds. The specific number may be, for example, five.

The controller 205 may examine the selected at least one first image. The controller 205 may attempt to detect an abusive element from each of the least one first image. For example, the controller 205 may attempt to detect an abusive element from a portion corresponding to a specific facial expression, body language, or body part corresponding to an abusive element from each of the at least one first image.

The controller 205 may perform image-processing using the at least one first image in order to detect an abusive element. The controller 205 may extract at least one feature from each of the at least one first image by the image-processing. The feature may be a specific shape, pattern, color, or a combination thereof included in the at least one first image. The controller 205 may determine whether the extracted feature includes a specific shape, pattern, color, or a combination thereof corresponding to the specific facial expression, body language, or a body part.

For example, the controller 205 may determine whether the extracted feature corresponds to at least one abusive element of an obscene gesture, an insult gesture, a racism gesture, sexual content, nudity, genitalia, sexual activity, unsanitary content, excreta, excretion, antisocial content, antihuman content, illegal conduct, criminal conduct, hate crime, violent conduct, maltreatment conduct, self-harmful conduct, a weapon, a drug, an antisocial symbol, hateful content, threatening content, phobia-inducing content, or blood.

Figure 5:
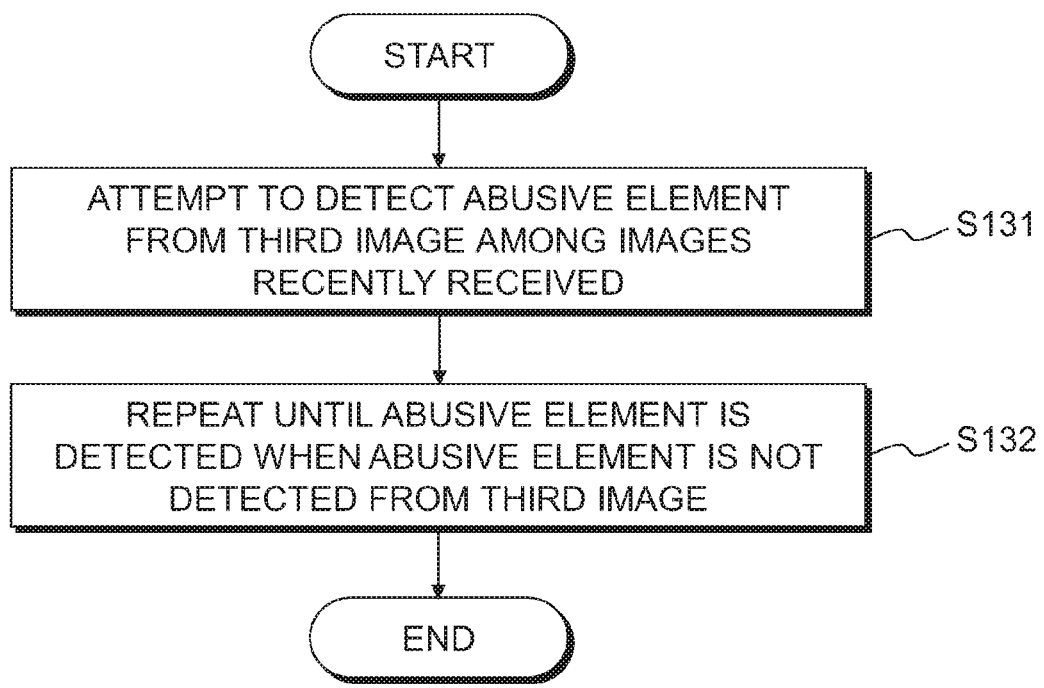
FIG. 5 is a flowchart illustrating a process of performing the operation of examining at least one first image selected from images included in an image stream according to an embodiment.

According to another embodiment, the controller 205 may examine an image recently received from corresponding time with regular or irregular cycles. FIG. 5 is a flowchart illustrating a specific process of performing the embodiment.

Referring to FIG. 5, the operation 131 may first be performed to attempt to detect the abusive element from at least one third image selected from images, which are included in the image stream, received in a period of recent specific time. The controller 205 of the second terminal 210 may select the at least one third image, as the first image, from images received in a period of recent specific time. The controller 205 may attempt to detect an abusive element from each of the at least one third image. The specific time may be, for example, three seconds.

Next, the operation S132 may be performed to repeat the operation S131 of attempting to detect the abusive element with regular or irregular cycles until the abusive element is detected when the abusive element is not detected from the at least one third image. The controller 205 of the second terminal 210 may repeat the operation 131 of attempting to detect an abusive element with regular or irregular cycles.

In other words, the controller 205 may wait for at least a period of specific waiting time to pass when an abusive element is not detected as a result of attempting to detect an abusive element from the selected at least one third image. The specific waiting time may be, for example, three seconds. The controller 205 may newly select at least third image from images received within a specific recent time from the current time after the at least specific waiting time passes. The controller 205 may attempt to detect an abusive element from the newly selected at least one third image. The controller 205 may repeat the process as described above until an abusive element is detected from the at least one third image.

Referring again to FIG. 3, the operation S150 may be next performed to display a message suggesting submitting reporting a user of the first terminal 200 as an abusive user when a second image included in the at least one first image is determined to include an abusive element as the result of the examination. As the result of the examination, the controller 205 of the second terminal 210 may determine that the second image of the at least one first terminal includes an abusive element. When there is the determination as described above, the output interface 204 of the second terminal 210 may display the message. The message may include content suggesting submitting reporting a user of the first terminal 200 as an abusive user.

The output interface 204 may display the message while the video communication session is being retained. In other words, the output interface 204 may display, as shown in FIG. 4, the message by overlaying the message with the screen on which an image of a user of the first terminal 200 and an image of a user of the second terminal 210 are displayed.

Figure 6:
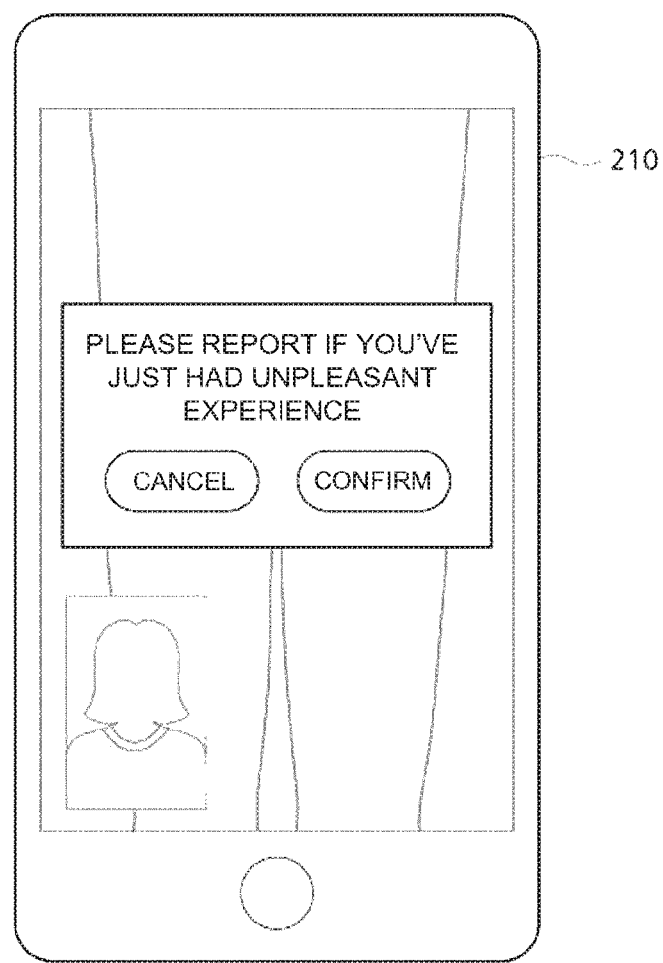
FIG. 6 is a front view illustrating a second video communication device in which a message suggesting reporting the other party is displayed while a video communication session is being retained according to an embodiment.

FIG. 6 is a front view of illustrating the second terminal 210 on which the message suggesting reporting the other party is displayed while the video communication session is being retained, according to an embodiment. As illustrated in FIG. 6, the output interface 204 of the second terminal 210 may the message by overlaying the message including the content such as "PLEASE REPORT IF YOU'VE JUST HAD UNPLEASANT EXPERIENCE." The output interface 204 may further display a confirmation button corresponding to a confirmation of the report and a cancellation button corresponding to a refusal of the report below the message.

After the output interface 204 of the second terminal 210 displays the message, when a specific time passes, and no input is received from a user of the second terminal 210, the output interface 204 may stop displaying the message and the buttons. In other words, after a specific time passes, the output interface 204 may again display a screen including an image of a user of the first terminal 200 and an image of a user of the second terminal 210, as illustrated in FIG. 4. The specific time may be, for example, three seconds.

The output interface 204 of the second terminal 210 may further display a timer while the message and the buttons are being displayed. The timer may display the remaining time until the display of the message and the buttons is stopped.

Figure 7:
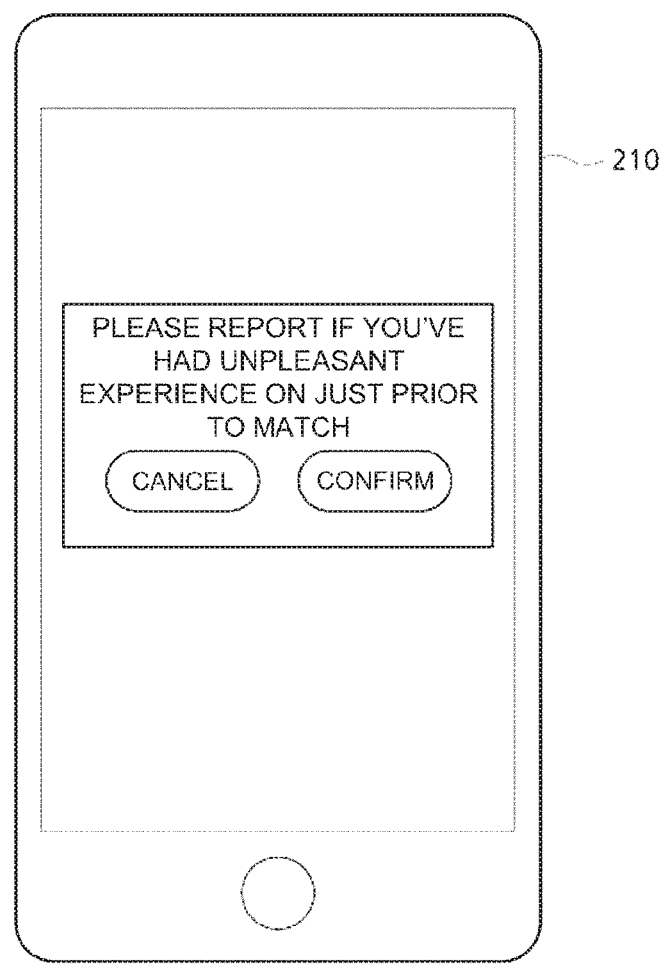
FIG. 7 is a front view illustrating a second video communication device in which a message suggesting reporting the other party is displayed after a video communication session is completed according to an embodiment.

According to another embodiment, the output interface 204 may display the message after the video communication session is completed. In other words, the output interface 204 may display the message by overlaying the message on a wait screen displayed after the video communication session with the first terminal 200 is completed FIG. 7 is a front view illustrating the second terminal 210 on which a message suggesting reporting the other party is displayed after the video communication session is completed, according to an embodiment. As illustrated in FIG. 7, the output interface 204 may display the message by overlaying the message including the content such as "PLEASE REPORT IF YOU'VE HAD UNPLEASANT EXPERIENCE ON JUST PRIOR TO MATCH." The output interface 204 may further display a confirmation button and a cancellation button below the message According to still another embodiment, the output interface 204 may display the second image with the message. In other words, the output interface 204 may display the message suggesting submitting the report with the second image in which an abusive element is determined to be included. The output interface 204 may display the second image and the message while the video communication session is being retained or after the video communication session is completed.

Figure 8:
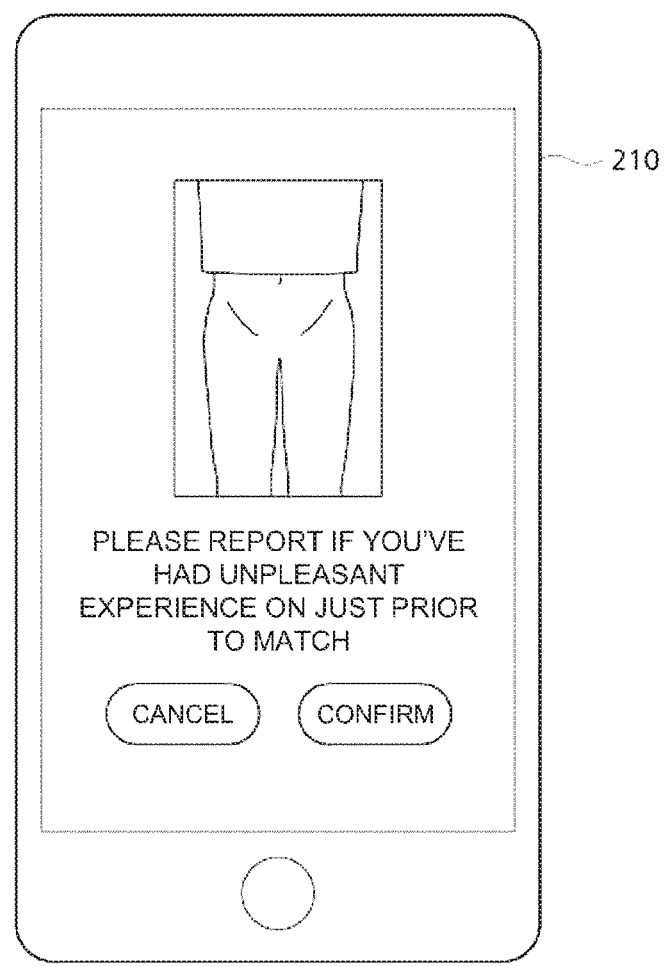
FIG. 8 is a front view illustrating a second video communication device in which a message suggesting reporting on the other party is displayed after a video communication session is completed according to another embodiment.

FIG. 8 is a front view illustrating the second terminal 210 in which the second image and the message are displayed together according to the embodiment as described above. As illustrated in FIG. 8, the output interface 204 may further display a confirmation button and a cancellation button below the message.

As described above, when an abusive element is detected from the image, the reporting an abusive user may be induced actively by automatically displaying a message suggesting the report. Accordingly, a healthy video communication may be induced between users. Further, a user who is making a video communication is prevented from being exposed to an inappropriate image from the other party.

Referring again to FIG. 3, next, operation S160 may be performed to receive the input of confirmation in response to the display of the message. A user of the second terminal 210 may input a touch-input to the confirmation button after confirming the displayed message. In other words, the input interface 201 of the second terminal 210 may receive the input of confirmation from the user of the second terminal 210 in response to the display of the message.

Next, operation S170 may be performed to transmit the reporting a user of the first terminal 200 as an abusive user and the second image to a server 100 in response to the received input of confirmation. The communication interface 202 of the second terminal 210 may transmit the report to the server 100 in response to the received input of confirmation. The communication interface 202 may further transmit the second image as an evidence, which is determined to include an abusive element.

Next, operation 180 may be performed to repeat the operation 130 of the examination through the operation 170 of the transmission with regular or irregular cycles until the video communication session is completed. The controller 205 of the second terminal 210 may examine at least one image of images newly received from the first terminal 200. When the examination determines that an image including an abusive element is present, the output interface 204 of the second terminal 210 may display the message suggesting reporting while the video communication session is being retained.

When, in response to the display of the message, receiving an input of refusal or not receiving an input of confirmation after a specific time passes, the controller 204 may stop displaying the message. When the input of confirmation in response to the display of the message is received in a period of a specific time, the communication interface 202 of the second terminal 210 may transmit the report and the image to the server 100.

The controller 205 of the second terminal 210 may control the above-described process to be repeated for the newly received image with regular or irregular cycles. The controller 205 may control the above-described process to be repeated, for example, every three seconds until the video communication session with the first terminal 200 is completed. Accordingly, the second terminal 210 may consistently examine images consecutively received from the first terminal 200.

Figure 9:
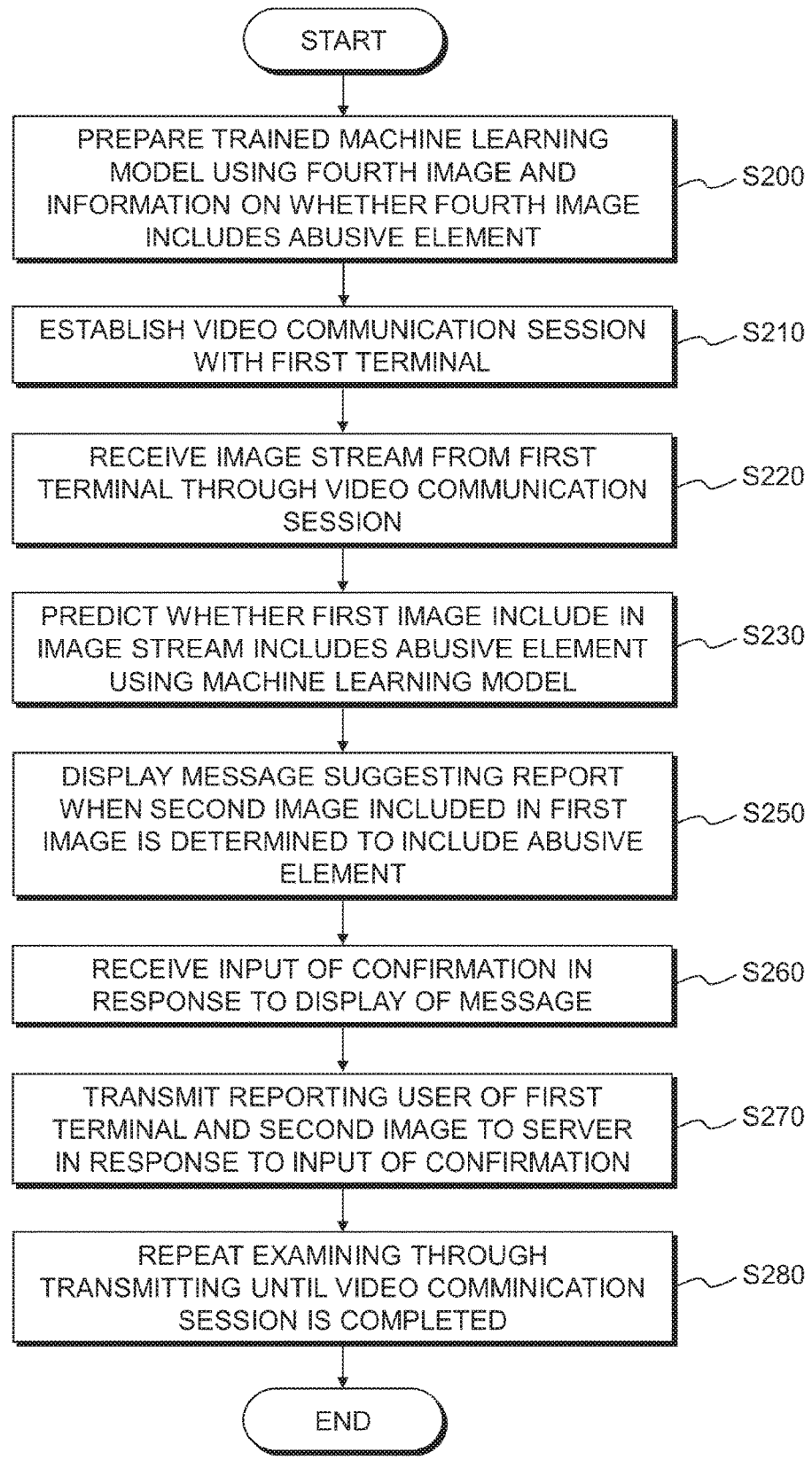
FIG. 9 is a flowchart illustrating a process of performing a video communication method according to another embodiment.

FIG. 9 is a flowchart illustrating a process of performing a video communication method according to another embodiment. Referring to FIG. 9, operation S200 may be first performed to prepare the trained machine learning model using at least one fourth image and information on whether each of the at least one fourth image includes an abusive element.

The storage 203 of the second terminal 210 may prepare the machine learning model. The machine learning model may correspond to the correlation between at least one feature included in an arbitrary image and information on whether the arbitrary image includes an abusive element.

The machine learning model may be a neural network including at least two layers. The machine learning model may include an input layer and an output layer. The machine learning model may further include at least one hidden layer.

The machine learning model may be the trained classification model using classification information on whether each of the at least one fourth image includes an abusive element and the at least one fourth image. The at least one fourth image may be previously collected through other video communication sessions or other sources. The at least one fourth image may include an abusive image including as abusive element and a non-abusive image excluding an abusive element. The classification information may be tag information corresponding to information on whether each of the at least one fourth image is an abusive image or non-abusive image.

The communication interface 202 of the second terminal 210 may receive the machine learning model from the server 100 or a separate server. The storage 203 of the second terminal 210 may store the received machine learning model.

According to another embodiment, the controller 205 of the second terminal 210 may train the machine learning model by itself. For example, the storage 203 of the second terminal 210 may prepare the at least one fourth image and the classification information. The controller 205 may train the machine learning model using the prepared at least one fourth image and the classification information. The storage 203 of the second terminal 210 may store the trained machine learning model.

The controller 205 may train the machine learning model using a deep learning algorithm. The machine learning model may include at least one of deep neural network (DNN), convolutional neural network (CNN), recurrent neural network (RNN), region-based convolutional neural networks (R-CNN), restricted Boltzmann machine (RBM), deep belief network (DBN), or deep Q-networks.

The machine learning model may be convolutional neural network (CNN). The machine learning model may include AlexNet, ZFNet, GoogLeNet, VGGNet, ResNet, Inception-ResNet, Inception-v2, Inception-v3, or Inception-v4.

The controller 205 may convert each of the at least one fourth image into an RGB format image having a width of 60 pixels and a height of 80 pixels using a convolutional layer. The controller 205 may train the machine learning model including Inception-v4 using each of the transformed images. The trained model may include total 4,330,627 variables. The size of each variable may be 4 bytes. Thus, the size of the trained model may be at least 17,322,508 bytes.

Next, operation S210 may be performed to establish the video communication session with the first terminal 200.

The communication interface 202 of the second terminal 210 may establish the video communication session with the first terminal 200.

Next, operation S220 may be performed to receive an image stream from the first terminal 200 through the video communication session. The communication interface 202 of the second terminal may receive an image stream from the first terminal 200 through the video communication session.

Next, operation S230 may be performed to predict whether the at least one first image selected from images included in the image stream includes an abusive element using the prepared machine learning model. The machine learning model may obtain at least one feature included in the first image as an input value. The controller 205 of the second terminal 210 may predict whether the at least one feature corresponds to a non-abusive element or abusive element using the machine learning model.

Figure 10:
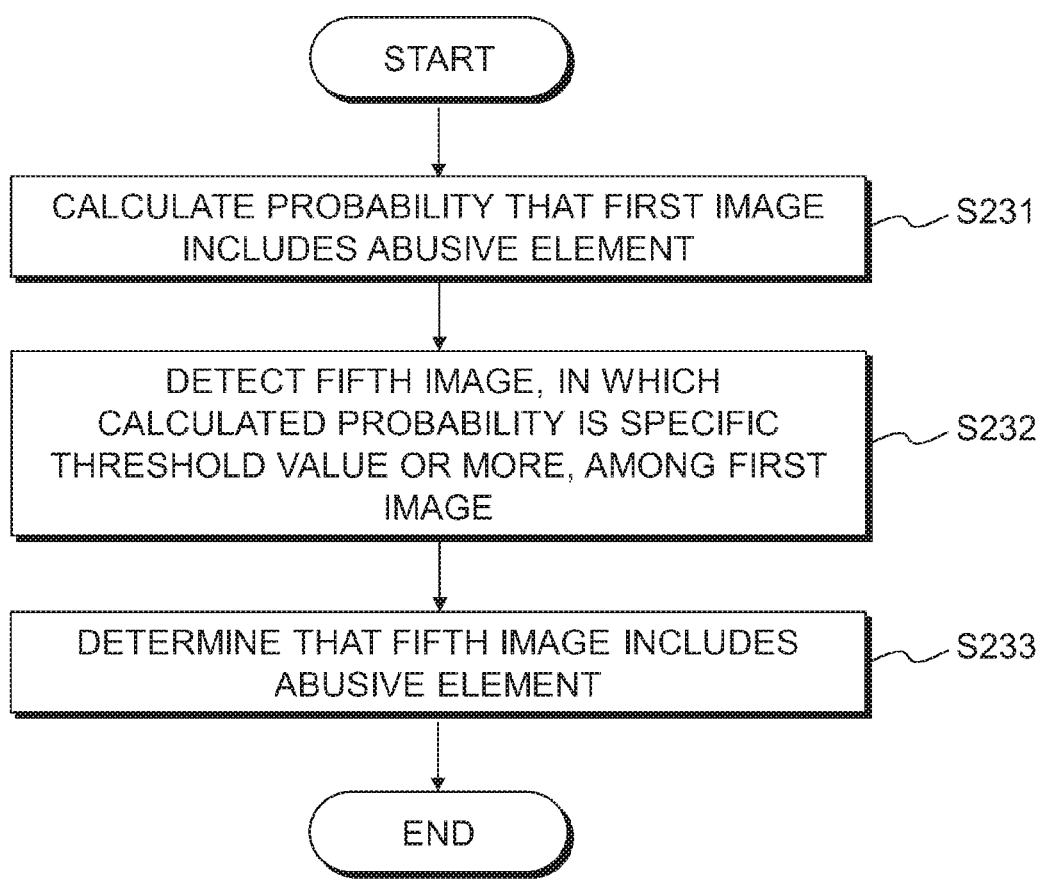
FIG. 10 is a flowchart illustrating a process of predicting whether at least one first image includes an abusive element using a machine learning model according to an embodiment.

FIG. 10 is a flowchart illustrating a process of performing operation S230 of predicting whether the at least one first image includes an abusive element using the machine learning model according to an embodiment. Referring to FIG. 10, operation S231 may be first performed to calculate the probability that the first image includes an abusive element for each of the at least one first image using the prepared machine learning model.

The controller 205 of the second terminal 210 may convert an image subjected to the examination into an RGB format image having a width of 60 pixels and a height of 80 pixels using a convolutional layer. The controller 205 may use the converted image as an input value of the machine learning model. The controller 205 may run the machine learning model.

As the result of the running as described above, the result value may be calculated from the output layer of the machine learning model. The result value may be, for example, a vector including three numerical values. The three numerical values, respectively, may correspond to the probability that the first image to be examined does not include an abusive element, the probability that the first image to be examined includes an abusive element, and the probability that the first image to be examined includes the appearance of a user of the first terminal 200, who takes off his or her clothes that the user wears on the upper part of the body. The sum of the three numerical values may be one.

Next, operation S232 may be performed to detect at least one fifth image, in which the calculated probability is a specific threshold value or more, among the at least one first image. The controller 205 of the second terminal 210 may determine whether the second numerical value among the three numerical values calculated for each of the at least one first image is the specific threshold value or more. The specific threshold value may be, for example, 0.97. The controller 205 may detect at least one or more fifth image that satisfies the above-described condition among the at least one first image. In other words, the controller 205 may detect the at least one fifth image calculated that the probability of including an abusive element is 97% or more.

Next, operation S233 may be performed to determine that each of the at least one fifth image includes an abusive element. The controller 205 of the second terminal 210 may determine that each of the detected at least one fifth image includes an abusive element.

Figure 11:
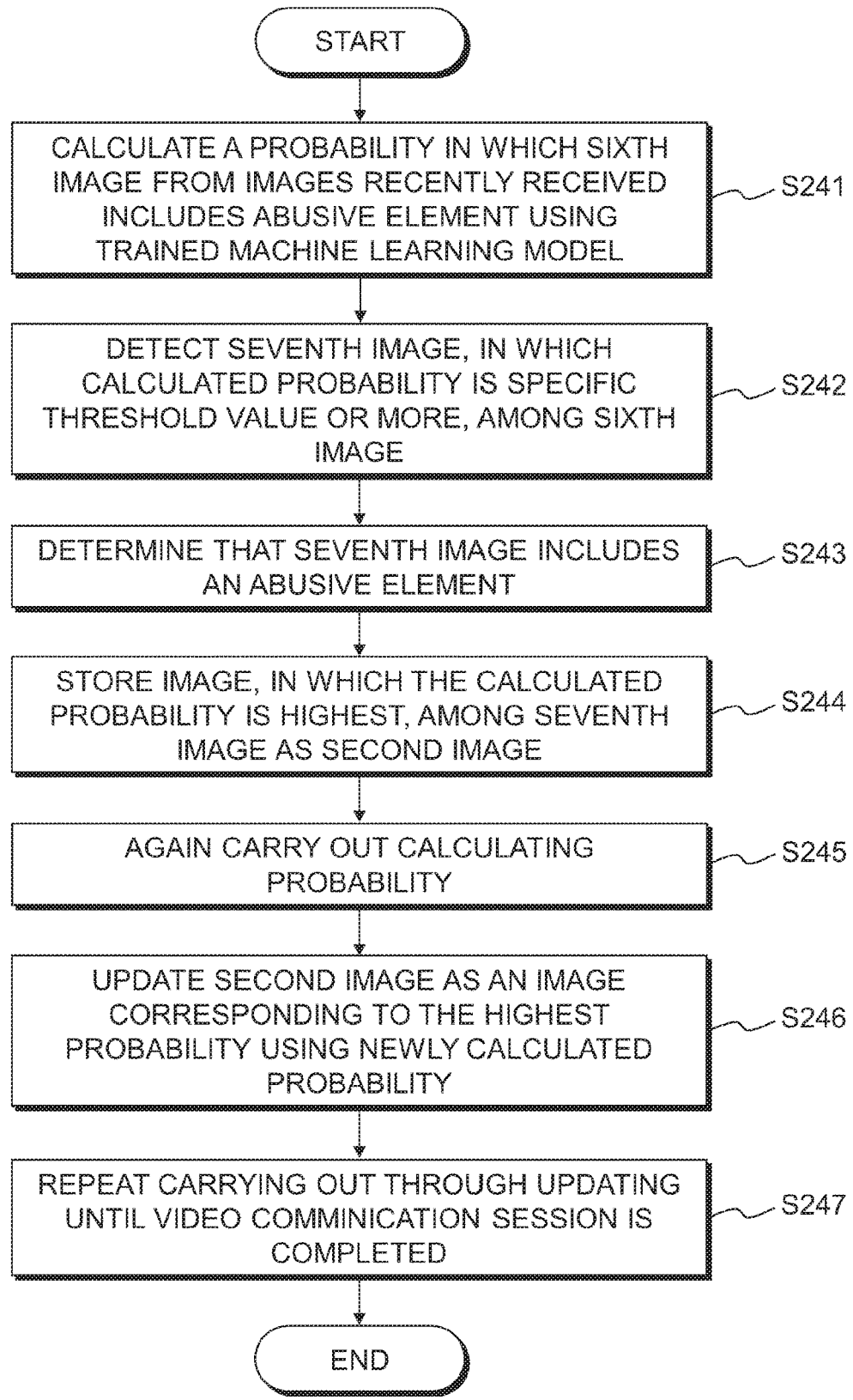
FIG. 11 is a flowchart illustrating a process of predicting whether at least one first image includes an abusive element using a machine learning model according to another embodiment.

FIG. 11 is a flowchart illustrating a process of predicting whether at least one first image includes an abusive element using a machine learning model according to another embodiment. Referring to FIG. 11, operation S241 may be first performed to calculate a probability, for each of at least one sixth image selected from images included in the image stream and received in a period of recent specific time, in which the at least one sixth image includes the abusive element using the trained machine learning model.

The controller 205 of the second terminal 210 may select at least one sixth image from images included in the image stream and received in a period of recent specific time. The specific time may be, for example, three seconds. The controller 205 may calculate the probability for each of the at least one sixth image. The controller 205 may calculate the probability in which the sixth image includes an abusive element in a manner similar to the operation S231 of calculating the probability in which the first image includes an abusive element.

Next, operation S242 may be performed to detect at least one seventh image, in which the calculated probability is a specific threshold value or more, among the at least one sixth image. The controller 205 of the second terminal 210 may detect the at least one seventh image in a manner similar to the operation S232 of detecting the at least one fifth image.

Next, operation S243 may be performed to determine that each of the at least one seventh image includes an abusive element. The controller 205 of the second terminal 210 may determine that each of the detected at least one seventh image includes an abusive element.

Next, operation S244 may be performed to store an image, in which the calculated probability is highest, among the at least one seventh image as the second image. The storage 203 of the second terminal 210 may separately store the calculated image, in which the calculated probability is highest, among the at least one seventh image. For example, the at least one seventh image may include an image having a probability of containing 97.2% of abusive elements, an image having the probability of 97.5%, and an image having the probability of 97.3%. The storage 203 may store an image having the probability of 97.5% among the three seventh images as the second image.

Next, operation S245 may be performed to again carry out operation S241 of calculating the probability after at least a period of specific wait time passes. The controller 205 of the second terminal 210 may wait for at least a specific wait time after the probability is calculated for each of the sixth images. The specific wait time may be, for example, three seconds.

Then, the controller 205 may select at least one eighth image from images included in the image stream and received within a specific recent time from the current time. The specific time may be, for example, three seconds. The controller 205 may calculate the probability that the eighth image includes an abusive element for each of the at least one eighth image using the prepared machine learning model.

Next, operation S246 may be performed to update the stored second image as an image corresponding to the highest probability when the highest probability among the probabilities calculated for the at least one eighth image is higher than the probability calculated for the stored second image. The controller 205 of the second terminal 210 may compare the highest probability among the newly calculated probabilities and the calculated probabilities with respect to the stored second image from each other.

When the highest probability is higher than the probability corresponding to the second image, the storage 203 of the second terminal 210 may update the stored second image to an image corresponding to the highest probability. In other words, the storage 203 may update the stored second image to the image having the highest probability among the at least one eighth image. When the highest probability is lower than or equal to the probability corresponding to the second image, the storage 203 of the second terminal 210 may maintain the stored second image without updating.

Next, operation S247 may be performed to repeat operation S245 of the calculating the probability and operation S246 of the updating for each of the at least one eighth image until the video communication session is completed. The controller 205 of the second terminal 210 may control the above-described process to be repeated for newly received images with regular or irregular cycles. Accordingly, after the video communication session is terminated, the storage 203 of the second terminal 210 may store an image, as a second image, having the highest probability of including an abusive element, among all the images examined while the video communication session is being retained.

Referring again to FIG. 9, next, operation S250 may be performed to display a message suggesting reporting a user of the first terminal 200 as an abusive user when the second image included in the at least one first image is determined to include an abusive element. When it is determined as described above, the output interface 204 of the second terminal 210 may display the message. The message may include a content suggesting reporting a user of the first terminal 200 as an abusive user.

Next, operation S260 may be performed to receive the input of confirmation in response to the display of the message. The input interface 201 of the second terminal 210 may receive the input of confirmation in response to the display of the message.

Next, operation S270 may be performed to transmit the reporting a user of the first terminal 200 as an abusive user and the second image to the server 100 in response to the received input of confirmation. The communication interface 202 of the second terminal 210 may transmit the report to the server 100 in response to the received input of confirmation. The report may correspond to the intent that a user of the first terminal 200 is an abusive user. The communication interface 202 of the second terminal 210 may further transmit the second image stored in storage 203 as an evidence to the server 100.

Next, operation S280 may be performed to repeat operation S230 of the predicting through operation S270 of the transmitting with regular or irregular cycles until the video communication session is completed. The controller 205 of the second terminal 210 may control the above-described process to be repeat for newly received images with regular or irregular cycles. The operation S280 may be excluded when operation S247 may be performed to repeat the operation S245 of calculating the probability and the operation S246 of the updating until the video communication session is completed according to a specific embodiment among the embodiments as described above.

Figure 12:
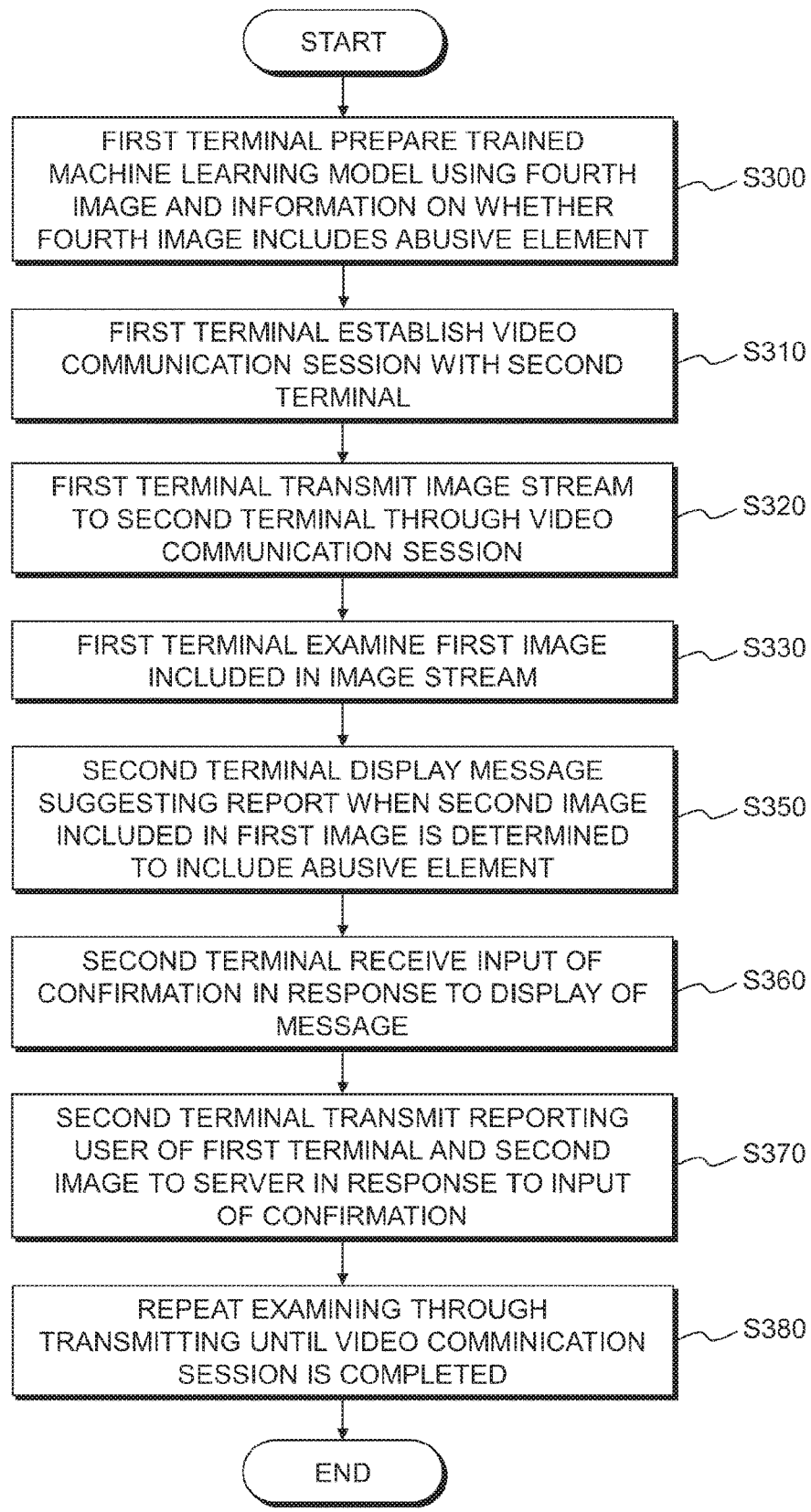
FIG. 12 is a flowchart illustrating a process of performing a video communication method according to still another embodiment.

FIG. 12 is a flowchart illustrating a process of performing a video communication method according to still another embodiment. Referring to FIG. 12, operation S220 may be first performed in which the first terminal 200 prepares the machine learning model. The storage 203 of the first terminal may prepare the machine learning model in a manner similar to operation S200 of preparing the machine learning model.

Next, operation S310 may be performed to establish a video communication session between the first terminal 200 and the second terminal 210. The communication interface 202 of the first terminal 200 may establish a video communication session with the second terminal 210 in a manner similar to the operation S110 of the establishing the video communication session.

Next, operation S320 may be performed in which the first terminal 200 transmits the image stream to the second terminal 210 through the video communication session. The communication interface 202 of the first terminal 200 may transmit the image stream to the second terminal 210 through the video communication session. The image stream may include the image captured or sound recorded in real time by the input interface 201 of the first terminal 200. In other words, the communication interface 202 of the first terminal 200 transmits the image of a user of the first terminal 200, which is being captured by the first terminal 200, or the sound of the user of the first terminal 200, which is being recorded by the first terminal 200 to the second terminal 210 continuously. The communication interface 202 of the first terminal 200 may consecutively transmit the video stream while the video communication session is being retained.

Next, operation S330 may be performed in which the first terminal 200 examines at least one first image selected from the images included in the image stream. The controller 205 of the first terminal 200 may select at least one first image from the images included in the image stream. In other words, the controller 205 of the first terminal 200 may select at least one first image from the images transmitted to the second terminal 210.

The controller 205 of the first terminal 200 may examine the selected at least one first image. The controller 205 of the first terminal 200 may examine the at least one first image in a manner similar to the operation S130 of the examining or the operation S230 of the predicting.

Next, operation S350 may be performed in which the second terminal 210 displays a message suggesting reporting a user of the first terminal 200 as an abusive user when the result of the examination determines that the second image included in the at least one first image includes an abusive element. When the result of the examination determines that the second image includes an abusive element, the communication interface 202 of the first terminal 200 may transmit the second image to the second terminal 210.

The communication interface 202 of the second terminal 210 may receive the second image from the first terminal 200. The storage 203 of the second terminal 210 may store the received second image. The output interface 204 of the second terminal 210 may display the message including content suggesting reporting a user of the first terminal 200 as an abusive user. The output interface 204 of the second terminal 210 may display the message in a manner similar to the operation S150 of the displaying the message.

Next, operation S360 may be performed in which the second terminal 210 may receive the input of confirmation in response to the display of the message. The input interface 201 of the second terminal 210 may receive the input of confirmation in a manner similar to the operation S160 of the receiving the input of confirmation.

Next, operation S370 may be performed, in which the second terminal 210 may transmit the reporting a user of the first terminal 200 as an abusive user and the second image to the server 100 in response to the received input of confirmation. The communication interface 202 of the second terminal 210 may transmit the report to the server 100 in response to the received input of confirmation. The report may correspond to the intent that a user of the first terminal 200 is an abusive user. The communication interface 202 of the second terminal 210 may further transmit the second image, as an evidence, received from the first terminal 200.

Next, operation S370 may be performed, in which the first terminal 200 and the second terminal 210 repeat the operation S330 of the examining through the operation S370 of the transmitting with regular or irregular cycles until the video communication session is completed. The controller 205 of the first terminal 200 may control the operation S330 of the examining to be repeat for newly transmitted images with regular or irregular cycles. The controller 205 of the second terminal 210 may control the operation S350 of the displaying the message through the operation S370 of transmitting to be repeated for newly received images with regular or irregular cycles.

According to the embodiment as described above, a healthy video communication between users can be induced. Further, a user in a video communication may be prevented from being exposed to an inappropriate image from the other party. Further, a user in a video communication may be prevented from feeling sexual shame or unpleasant due to the image of the other party.

The embodiment as described above may be embodied in a non-transitory computer-readable recording medium having recorded thereon computer-executable instruction codes, such as a program module executable by the computer. The non-transitory computer-readable recording medium may be any available medium which can be accessed by the computer. Further, the non-transitory computer-readable recording medium may include any volatile and non-volatile media and any removable and non-removable media.

Furthermore, the non-transitory computer-readable recording medium may include any computer storage medium and communication medium. The computer storage medium may include any volatile and non-volatile media or any removable and non-removable media embodied by a certain method or technology for storing information such as computer-readable instruction codes, a data structure, a program module, or other data. The communication medium may include computer-readable instruction code, a data structure, a program module, other data of modulated data signals, or other transmission mechanisms, and may include any information transmission medium.

It should be understood that embodiments described herein should be considered in a descriptive sense only and not for purposes of limitation. Descriptions of features or aspects within each embodiment should typically be considered as available for other similar features or aspects in other embodiments.

DESCRIPTION OF REFERENCE NUMBER

100: server
200: first video communication device, first terminal
201: input interface
202: communication interface
203: storage
204: output interface
205: controller
210: second video communication device, second terminal
300: third video communication device, third terminal

The invention claimed is:

1. A video communication method comprising:
   establishing a video communication session with a first terminal;
   receiving an image stream from the first terminal in the video communication session;
   examining at least one first image selected from images included in the image stream;
   displaying a message suggesting reporting a user of the first terminal as an abusive user based on determining that a second image included in the at least one first image includes an abusive element;
   receiving input of confirmation in response to the displaying the message; and
   transmitting the reporting the user of the first terminal as the abusive user and the second image to a server in response to the received input of confirmation.

2. The video communication method of claim 1, wherein the examining comprises attempting to detect the abusive element from each of the at least one first image.

3. The video communication method of claim 2, wherein the attempting to detect the abusive element comprises attempting to detect a portion corresponding to a specific facial expression, a specific body language, or a specific body part from each of the at least one first image.

4. The video communication method of claim 3, wherein the attempting to detect a portion corresponding to a specific facial expression, a specific body language, or a specific body part comprises attempting to detect a portion corresponding to at least one of an obscene gesture, an insult gesture, a racism gesture, sexual content, nudity, genitalia, sexual activity, unsanitary content, excreta, excretion, antisocial content, antihuman content, illegal conduct, criminal conduct, hate crime, violent conduct, maltreatment conduct, self-harmful conduct, a weapon, a drug, an antisocial symbol, hateful content, threatening content, phobia-inducing content, and blood from each of the at least one first image.

5. The video communication method of claim 1, wherein the examining comprises attempting to detect the abusive element from at least one third image selected from images included in the image stream and received in a specific time period.

6. The video communication method of claim 5, wherein the examining further comprises repeating the attempting to detect the abusive element at regular or irregular intervals until the abusive element is detected if the abusive element is not detected from the at least one third image.

7. The video communication method of claim 5, further comprising, after the transmitting, repeating the examining through the transmitting with regular or irregular intervals until the video communication session is completed.

8. The video communication method of claim 1, further comprising, before the establishing the video communication session, preparing a machine learning model trained using information on at least one fourth image and on whether each of the at least one fourth image includes the abusive element,
   wherein the examining includes predicting whether the at least one first image includes the abusive element using the trained machine learning model.

9. The video communication method of claim 8, wherein the predicting comprises:
   calculating a probability, for each of the at least one first image, in which the at least one first image includes the abusive element using the trained machine learning model;
   detecting at least one fifth image, in which the calculated probability is a specific threshold value or higher, among the at least one first image; and
   determining that each of the at least one fifth image includes the abusive element.

10. The video communication method of claim 8, wherein the predicting comprises:

calculating a probability, for each of at least one sixth image selected from images included in the image stream and received in a specific time period, in which the at least one sixth image includes the abusive element, using the trained machine learning model;

detecting at least one seventh image, in which the calculated probability is a specific threshold value or higher, among the at least one sixth image;

determining that each of the at least one seventh image includes the abusive image; and storing an image as the second image, in which the calculated probability is the highest, among the at least one seventh image.

11. The video communication method of claim 10, wherein the predicting further comprises:

calculating, after at least a waiting time period passes, a probability, for each of at least one eighth image selected from images included in the image stream and received in the specific time period, in which the at least one eighth image includes the abusive element using the trained machine learning model;

updating the stored second image as an image corresponding to a highest probability if the highest probability among the probability calculated for each of the at least one eighth image is higher than the probability calculated for the stored second image; and repeating the calculating the probability and the updating for each of the at least one eighth image until the video communication session is completed.

12. The video communication method of claim 1, wherein the displaying the message comprises displaying the message after the video communication session is completed or while the video communication session is being maintained.

13. The video communication method of claim 1, wherein the displaying the message comprises displaying the message with the second image.

14. A non-transitory computer-readable recording medium having recorded thereon a program for executing the video communication method of claim 1.

15. A video communication method comprising:

establishing a video communication session between a first terminal and second terminal;

transmitting, by the first terminal, an image stream to the second terminal in the video communication session;

examining, by the first terminal, at least one first image selected from images included in the image stream;

displaying, by the second terminal, a message suggesting reporting a user of the first terminal as an abusive user based on determining by the examination that a second image included in the at least one first image includes an abusive element;

receiving, by the second terminal, input of confirmation in response to the displaying the message; and transmitting, by the second terminal, the reporting the user of the first terminal as the abusive user and the second image to a server in response to the received input of confirmation.

16. The video communication method of claim 15, further comprising:

after the examining, transmitting, by the first terminal, the second image to the second terminal; and receiving and storing, by the second terminal, the second image.

17. A video communication device comprising:

a communication interface configured to establish a video communication session with a first terminal and to receive an image stream from the first terminal in the video communication session;

a controller configured to examine at least one image selected from images included in the image stream;

an output interface configured to display a message suggesting reporting a user of the first terminal as an abusive user based on the controller determining that a second image included in the at least one first image includes an abusive element; and an input interface configured to receive input of confirmation in response to the displaying the message, wherein the communication interface transmits the reporting the user of the first terminal as the abusive user and the second image to a server in response to the received input of confirmation.

* * * * *